(12) United States Patent  (10) Patent No.: US 7,920,247 B2
Kitano  (45) Date of Patent: Apr. 5, 2011

(54) DISTANCE MEASUREMENT SYSTEM AND DISTANCE MEASUREMENT METHOD

(75) Inventor: Shogo Kitano, Sagamihara (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 276 days.

(21) Appl. No.: 12/276,729

(22) Filed: Nov. 24, 2008

(65) Prior Publication Data

US 2009/0141260 A1 Jun. 4, 2009

(30) Foreign Application Priority Data

Nov. 30, 2007 (JP) ................................. 2007-310620
Jul. 23, 2008 (JP) ................................. 2008-189690

(51) Int. Cl.
*G01C 3/00* (2006.01)
(52) U.S. Cl. ........................................ 356/3.1; 356/3.11
(58) Field of Classification Search .................... 356/3.1, 356/3.11, 4.01; 382/103, 106, 107
See application file for complete search history.

(56) References Cited

U.S. PATENT DOCUMENTS

| 7,812,931 B2* | 10/2010 | Nishiuchi | 356/3.11 |
| 2003/0193657 A1* | 10/2003 | Uomori et al. | 356/3.1 |
| 2008/0044060 A1* | 2/2008 | Satoh et al. | 382/103 |

FOREIGN PATENT DOCUMENTS

JP  2000-193438 A  7/2000

* cited by examiner

*Primary Examiner* — Isam Alsomiri
(74) *Attorney, Agent, or Firm* — Foley & Lardner LLP

(57) ABSTRACT

A distance measurement system includes: an projection apparatus (1) which projects measurement beams (PL1, PL2) at least at first and second projection angles ($\alpha 3$, $\alpha 15$, $\alpha$, $\beta$) towards a detection area; an image pick-up apparatus (2) which picks up an image of a first reflected light (LB1) and an image of a second reflected light (LB2) from the detection area. The system further includes: a distance calculation unit (32) which calculates a first distance (d1) to a first measurement point (P2, P5) and a second distance (d2) to a second measurement point (P4, P7); a judgment unit (33) which judges that specular reflection is caused; and an operation unit (34) which, when it is judged by the judgment unit (33) that the specular reflection is caused, calculates a distance (d4) to a detection object (MB1, MB2) causing the specular reflection.

11 Claims, 15 Drawing Sheets

FIG. 6

| PROJECTION ANGLE αi | PIXEL PXj WITH MAXIMUM PIXEL VALUE (SHOOTING ANGLE γj) | DISTANCE di | REFLECTION OBJECT DISTANCE dr | PIXEL PX(j+1) WITH MAXIMUM PIXEL VALUE (SHOOTING ANGLE γ(j+1)) | DISTANCE di | REFLECTION OBJECT DISTANCE dr | PIXEL PXj WITH MAXIMUM PIXEL VALUE |
|---|---|---|---|---|---|---|---|
| α1 | PX3 | d30 | - | PX7 | d30 | - | |
| α2 | PX4 | d40 | - | PX14 | d40 | - | |
| α3 | PX5 | d1 | - | PX6 | d1 | - | |
| ... | ... | ... | ... | ... | ... | ... | |
| α15 | PX6 | d2(<d1) | d4 | PX6 | d2(<d1) | d4 | |
| ... * | ... | ... | ... | ... | ... | ... | |

*MULTIPLE REFLECTION

DISTANCE MEASUREMENT SYSTEM AND DISTANCE MEASUREMENT METHOD

BACKGROUND OF THE INVENTION

1. Field of the Invention

The present invention relates to a distance measurement system which projects irradiation light onto a detection object and calculates information of distance to the detection object, and relates to a distance measurement method.

2. Description of the Related Art

A known distance measurement system projects light towards a detection target area, picks up an image of reflected light returned from the detection object because of specular reflection and/or scattering by means of a pick-up device such as a CCD, and processes information of the picked up image to measure the distance to the detection object or a shape thereof. In the case where the projected light is specularly reflected, the specularly-reflected light is sometimes next scattered and incident onto the pick-up device as multiple reflected light, thus providing incorrect distance information. In other words, the presence of such multiple reflected light makes it difficult to obtain highly-accurate distance information.

Accordingly, in order to eliminate the influence of multiple reflection, a conventional distance measurement system using a space code judges the presence of multiple reflection by allocating a predetermined space code to projection angle of measurement beam projected at the irradiation step and judging whether the space code increases or not in the picked up image information (see Japanese Patent Unexamined Publication No. 2000-193438).

BRIEF SUMMARY OF THE INVENTION

However, in the above conventional art, when the received light is judged to be multiple reflected light, the distance to the measurement object is just calculated after eliminating the incorrect distance information obtained because of the multiple reflected light. It is therefore impossible to calculate a distance to a detection object located at such a position that provides high specular reflectance.

The present invention was made in the light of the aforementioned problem of the conventional art. An object of the present invention is to provide a distance measurement system and a distance measurement method which are capable of calculating a distance to a detection object located at such a position that provides high specular reflectance.

The first aspect of the present invention provides a distance measurement system. The system includes: a projection apparatus which projects measurement beams at least at first and second projection angles towards a detection area; an image pick-up apparatus which picks up an image of a first reflected light and an image of a second reflected light from the detection area and outputs image signals. The first reflected light corresponds to the measurement beam projected at the first projection angle, and the second reflected light corresponds to the measurement beam projected at the second projection angle. The system further includes: a distance calculation unit which, based on the image signals, calculates a first distance to a first measurement point from a first incidence angle of the first reflected light onto the image pick-up apparatus, the first projection angle and an inter-apparatus distance between the projection apparatus and the image pick-up apparatus, and calculates a second distance to a second measurement point from a second incidence angle of the second reflected light onto the image pick-up apparatus, the second projection angle and the inter-apparatus distance; a judgment unit which judges that specular reflection is caused when the first incidence angle of the first reflected light is equal to the second incidence angle of the second reflected light; and an operation unit which, when it is judged by the judgment unit that the specular reflection is caused, calculates a distance to a detection object causing the specular reflection based on a longest distance among the first distance to the first measurement point and the second distance to the second measurement point and the first and second projection angles when the first and second incidence angles are judged to be equal to each other.

The second aspect of the present invention provides a distance measurement method. The method includes: projecting measurement beams at least at first and second projection angles towards a detection area; picking up an image of a first reflected light and an image of a second reflected light from the detection area, and outputting image signals. The first reflected light corresponds to the measurement beam projected at the first projection angle, and the second reflected light corresponds to the measurement beam projected at the second projection angle. The method further includes: based on the image signals, calculating a first distance to a first measurement point from a first incidence angle of the first reflected light onto an image pick-up apparatus, the first projection angle and an inter-apparatus distance between a projection apparatus and the image pick-up apparatus, and calculating a second distance to a second measurement point from a second incidence angle of the second reflected light onto the image pick-up apparatus, the second projection angle and the inter-apparatus distance; judging that specular reflection is caused when the first incidence angle of the first reflected light is equal to the second incidence angle of the second reflected light; and when it is judged that the specular reflection is caused, calculating a distance to a detection object causing the specular reflection based on a longest distance among the first distance to the first measurement point and the second distance to the second measurement point and the first and second projection angles when the first and second incidence angles are judged to be equal to each other.

BRIEF DESCRIPTION OF THE SEVERAL VIEWS OF THE DRAWING

FIG. 6 is a view showing a distance information table;

FIG. 14 is a view showing a relation between two reflection points of the multiple reflected light, the projection angle of a measurement beam from the light projection apparatus, the shooting angle of the image pick-up apparatus, an angle of inclination at the reflection point, and the like.

DETAILED DESCRIPTION OF THE INVENTION

First Embodiment

Figure 1:
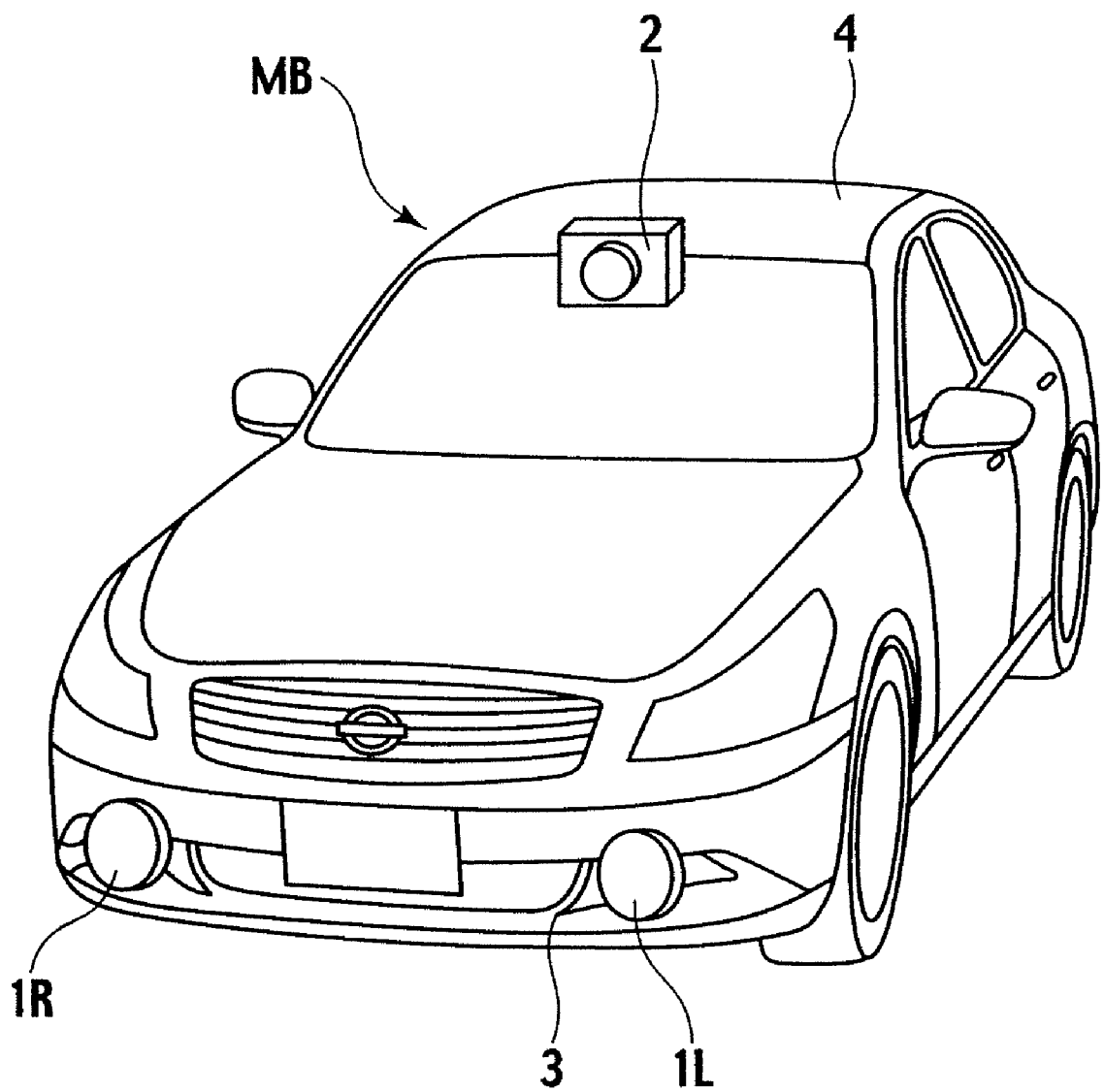
FIG. 1 is a perspective view showing a vehicle on which a distance measurement system according to a first embodiment of the present invention is mounted.

A description is given of an embodiment of a distance measurement system of the present invention with reference to FIGS. 1 to 8. The distance measurement system according to this embodiment is provided for a vehicle such as a passenger car. FIG. 1 shows a vehicle MB on which the distance measurement system of this embodiment is mounted. The distance measurement system includes first and second light projection apparatuses 1L and 1R, an image pick-up apparatus 2, and a control unit CU of FIG. 4.

The first and second light projection apparatuses 1L and 1R are provided near left and right ends of a front bumper 3 of the vehicle MB, respectively. The first and second light projection apparatuses 1L and 1R individually project laser beams from inner laser light sources towards a detection target area in front of the vehicle. At projecting the beams towards the detection target area, the projection apparatuses 1L and 1R project in the right-left direction. The irradiation light is a slit beam which is thin and elongated in a direction perpendicular to the road surface, but only should be irradiation light whose angle of the projection to the detection target area can be read out. The irradiation light may be a spot beam. The first and second light projection apparatuses 1L and 1R are the same. The first light projection apparatus 1L projects a beam diagonally forward to the right in front of the vehicle. The second light projection apparatus 1R projects a beam diagonally forward to the left in front of the vehicle. The image pick-up apparatus 2 picks up an image in synchronous with light projection of the individual first and second light projection apparatuses 1L and 1R. Each of the light projection apparatuses 1L and 1R is referred to as a light projection apparatus 1 below.

The irradiation light can be a pulsed light, and it is possible to obtain a single image at a predetermined light projection angle either by one pulse or by a plurality of pulses.

The image pick-up apparatus 2 includes a camera attached to around upper central part of a windshield, or in the vicinity of a rearview mirror (not shown) at central part of a front end on the back side of a roof panel 4. In the distance measurement system of this embodiment, the light projection apparatus 1 projects a slit beam forward in front of the vehicle while the image pick-up apparatus 2 picks up an image of a view in front of the vehicle. The image pick-up apparatus 2 picks up a brightness image of light produced by reflection of the measurement beam projected from the light projection apparatus 1 to a detection object. The distance measurement system projects a beam for detection towards the detection object in the detection target area, which is in front of the vehicle, and detects reflected light from the detection object. In the description of this specification, the reflected light includes light returned because of specular reflection and/or scattering (diffusion).

Figure 2A:
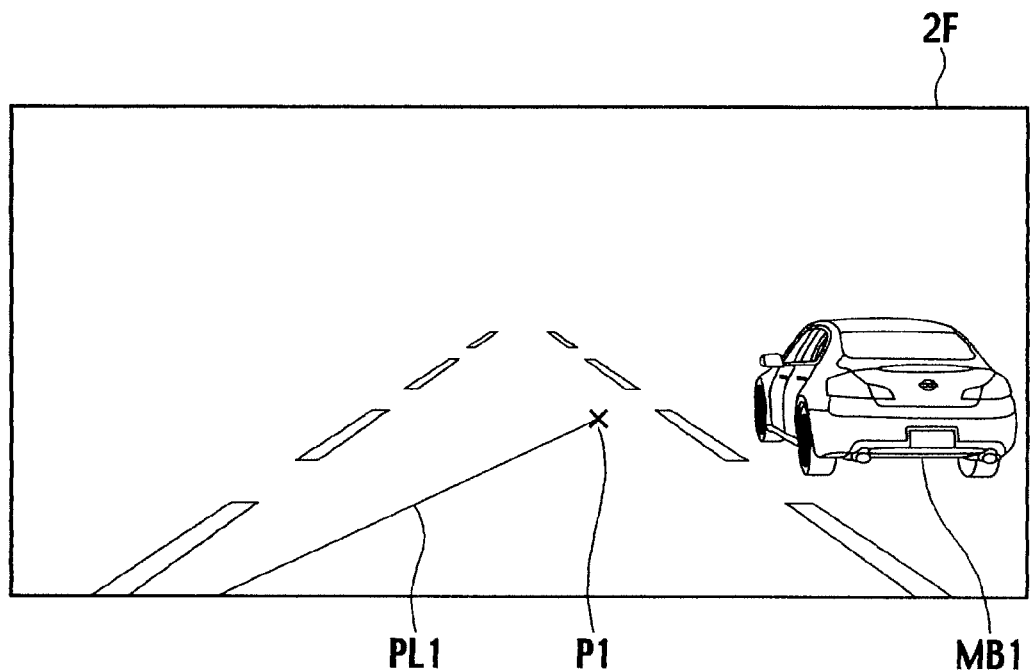
FIG. 2A is a view showing an example of an image in a camera field of view during distance measurement in the first embodiment.
Figure 2B:
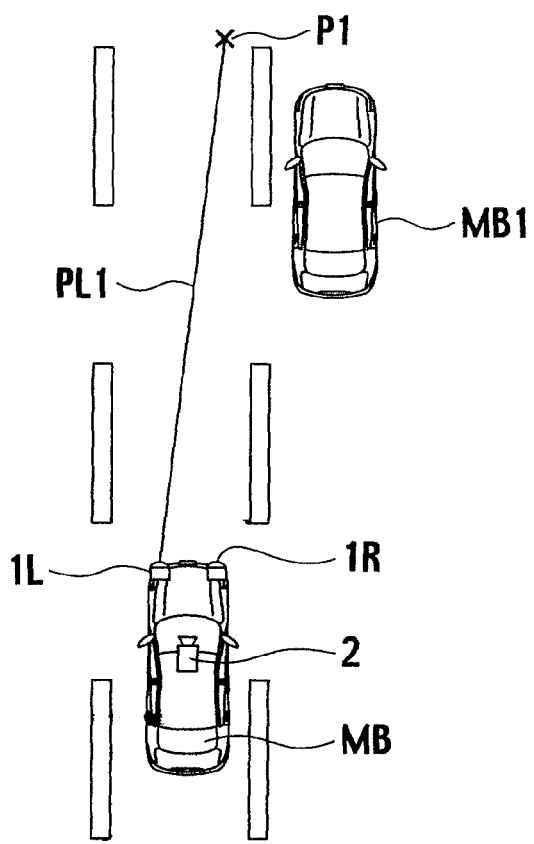
FIG. 2B is a plan view showing an arrangement in the outside of the vehicle in a state of FIG. 2A.

FIG. 2A shows an image example 2F of a view in front of the vehicle which is picked up by the camera of the image pick-up apparatus 2 (hereinafter, just referred to as the image pick-up apparatus 2). FIG. 2B is a plan view showing an arrangement in the outside of the vehicle corresponding to the image example 2F of FIG. 2A. As shown in FIG. 2B, the light projection apparatus 1 moves a slit-like measurement beam PL1 in horizontal and vertical directions to scan the area in front of the vehicle. For convenience of the explanation, the measurement beam scans the area in front of the vehicle diagonally downward in the horizontal direction. In this case, the detection object is a vehicle, a passerby (not shown), or the like in front of and in right and left front of the vehicle MB, for example, a vehicle MB1 in the right front. The road surface is only used for judgment of a multiple reflected light and is not the detection object. It is also possible to pick up an image of the detection target area by moving a horizontal slit beam in the vertical direction for scanning.

In FIG. 2B, the measurement beam PL1 is projected to a point P1 on the road surface. For the convenience of explanation, the measurement beam PL1 is shown also in the field 2F of FIG. 2A. However, the measurement beam PL1 is not actually picked up by the image pick-up apparatus 2, and an image of the point P is picked up by the image pick-up apparatus 2 through the reflected light from the point P.

Figure 3:
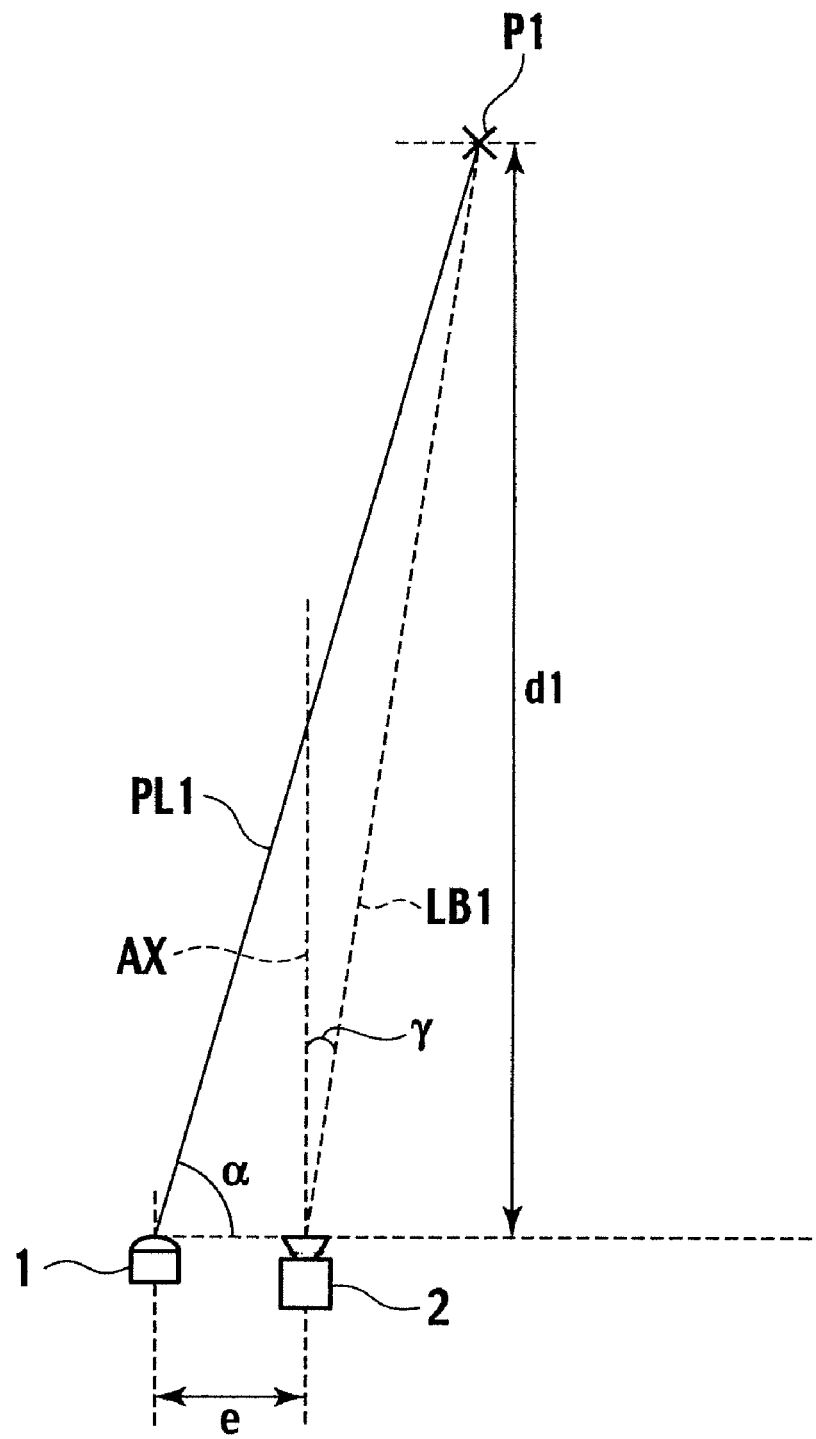
FIG. 3 is a view for explaining a principle of distance measurement by triangulation.

FIG. 3 is an explanatory view of a distance measurement principle using the light projection apparatus 1 and image pick-up apparatus 2. In FIG. 3, a light projection angle α is an angle between the measurement beam PL1 projected from the light projection apparatus 1 to the point P1 and a vehicle width direction. A shooting angle γ (also referred to as an incidence angle γ) is an angle of incidence of a reflected light LB1 from the point P1 on the road surface with respect to the forward direction of the vehicle, or with respect to an optical axis AX of an objective lens within the image pick-up apparatus 2. "e" is a known distance between the light projection apparatus 1 and image pick-up apparatus 2 in the vehicle width direction. By the principle of triangulation, a distance d1 between the image pick-up apparatus 2 and the point P1 is calculated by the following equation (1).

$$d1 = e \cdot \left( \frac{\sin\alpha \cdot \cos\gamma}{\cos(\alpha + \gamma)} \right) \quad (1)$$

Figure 4:
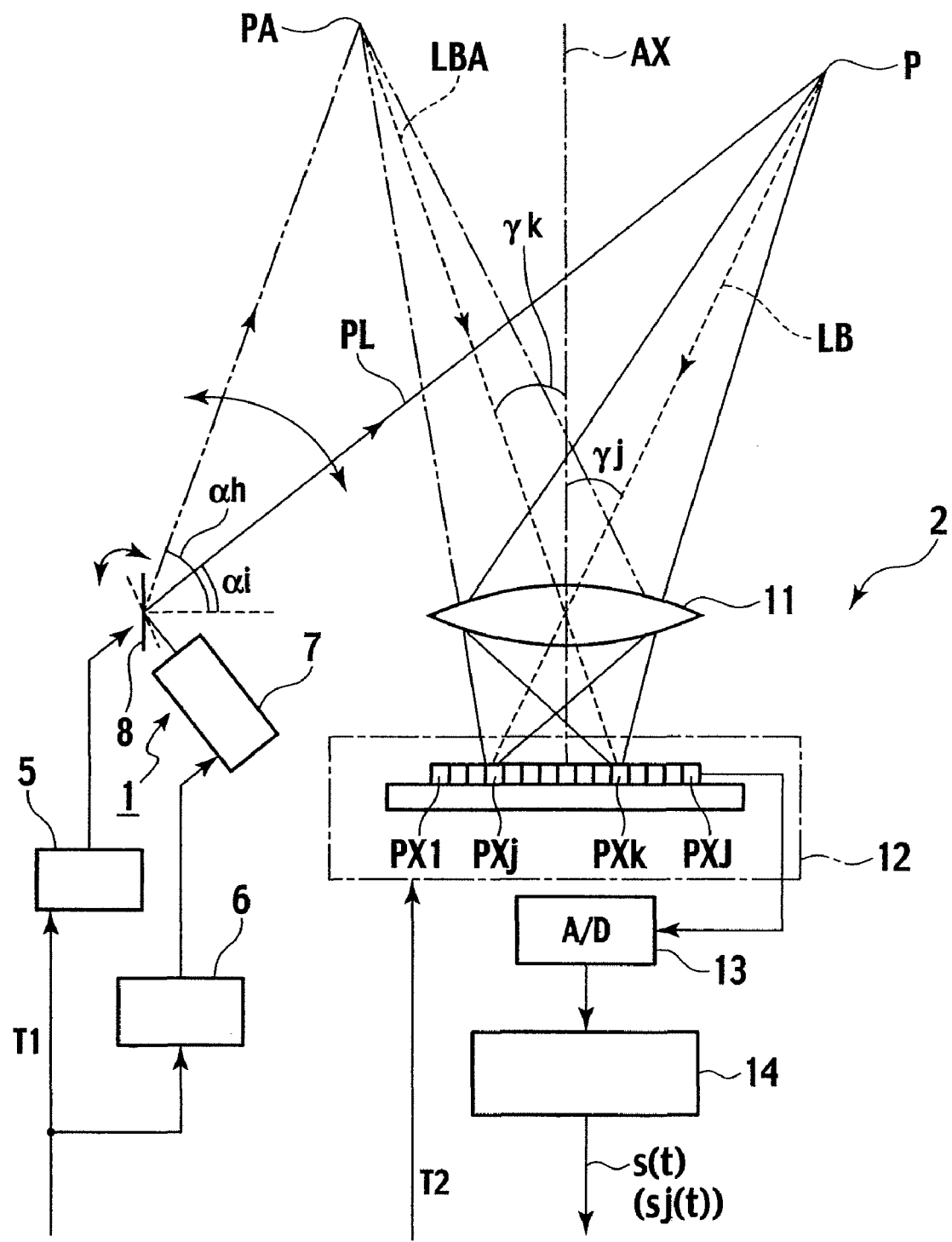
FIG. 4 is a view showing a configuration of an optical system and the like of the distance measurement system.

FIG. 4 shows a configuration of the light projection apparatus 1 and image pick-up apparatus 2. The light projection apparatus 1 includes: a laser light source (line laser) 7 outputting the measurement beam PL composed of laser light; a mirror 8 refracting the measurement beam PL; a laser driving unit 6 driving the laser light source 7; and a mirror driving unit 5 driving the mirror 8. The mirror and laser driving units 5 and 6 receive a light projection signal T1 from the control unit CU of FIG. 5. The laser light source 7 is turned on by the laser driving unit 6 according to the light projection signal T1. The mirror 8 is rotated through a not-shown motor by the mirror driving unit 5 according to the light projection signal T1. The mirror 8 is driven so that the projection angle $\alpha i$ of the measurement beam PL changes from a predetermined minimum angle $\alpha 1$ to a predetermined maximum angle $\alpha I$ (I is an integer not less than 2, i=1 to I) at a constant angular speed.

In FIG. 4, the image pick-up apparatus 2 includes: an objective lens 11; and an image pick-up element 12 (photoelectric conversion element 12) including a number of pixels of charge coupled devices (CCDs), complementary metal oxide semiconductors (CMOSs), or the like which are two-dimensionally arranged. The image pick-up apparatus 2 picks up an image of an area in front of the vehicle while the light projection apparatus 1 projects the irradiation light. The image pick-up apparatus 2 further includes: an A/D converter 13 (analog-to-digital converter) converting analog image signals outputted from the image pick-up element 12 to digital image signals; and an image memory 14 storing the A/D converted image signals.

The number of pixels of the image pick-up element 12 are two-dimensionally arranged although FIG. 4 shows only J pixels PXj (j=1 to J) arranged in a horizontal line (J is an integer not less than 2). In the following description, processing is performed for an image signal sj(t) of the pixels PXj in a line, but is also performed for image signals of the pixels in other lines.

In FIG. 4, the measurement beam PL is projected to the point P at the projection angle $\alpha i$, and the reflected light LB from the point P is incident into a j-th pixel PXj at an angle $\gamma j$ to the optical axis AX of the objective lens 11, or at the shooting angle $\gamma j$. In a similar manner, when the measurement beam PL is projected to a point PA at a projection angle $\alpha h$, for example, a reflected light LBA from the point PA is received by a k-th pixel PXk at a shooting angle $\gamma k$. The shooting angle $\gamma j$ of a reflected light received by each pixel PXj is previously known as described above. The size of the image of the reflected light on the image pick-up element 12 varies depending on the distance between the image pick-up apparatus 2 and the point P. However, the shooting angle $\gamma j$ which is an angle of incidence of the reflected light LB from the point P can be accurately calculated by specifying a pixel (PXj herein) having a largest amount of light, for example.

Accordingly, the distance d1 to the point P can be calculated by loading a single image picked up and created upon projection with an arbitrary projection angle $\alpha i$; specifying a pixel having a maximum brightness in each line; determining the shooting angle $\gamma j$ previously assigned to the specified pixel; and putting the shooting angle $\gamma j$ and projection angle $\alpha i$ into the expression (1).

Figure 5:
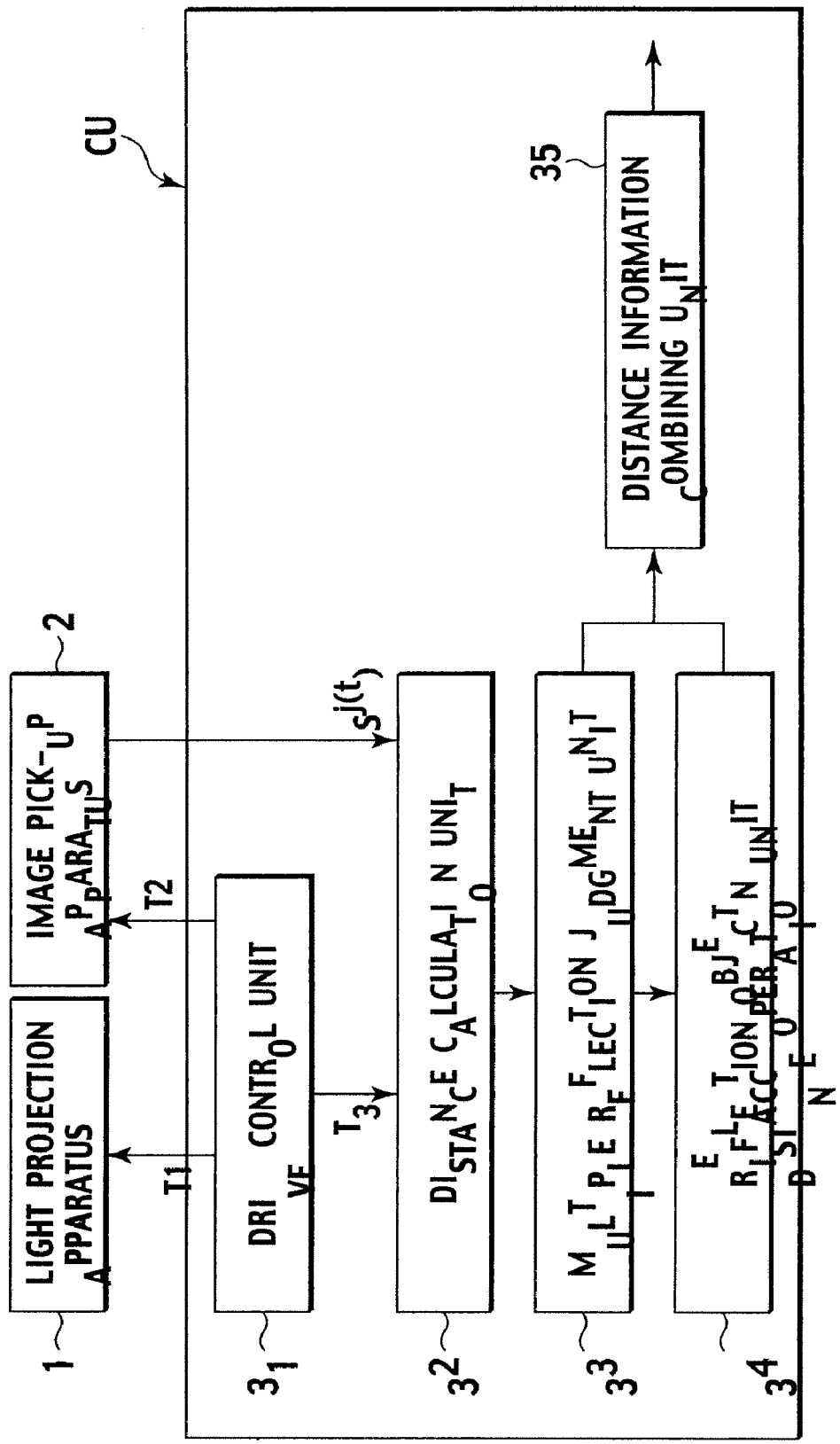
FIG. 5 is a block diagram showing a configuration of a control unit of the distance measurement system.

The image pick-up element 12 starts image pick-up upon a camera control signal T2 outputted from the control unit CU of FIG. 5 in synchronous with the light projection signal T1. Each time that the image pick-up element 12 picks up an image of the detection target area in front of the vehicle when the measurement beam PL is projected at the arbitrary projection angle $\alpha i$, the image signal sj(t) read out from each pixel PXj of the image pick-up element 12 is stored in the image memory 14 through the A/D converter 13. The image signal from each pixel of the other lines of the image pick-up element 12 is processed in a similar way. The image memory 14 stores data of a plurality of images corresponding to the plurality of projection angles $\alpha i$. When the image pick-up apparatus 2 picks up an image of the area in front of the vehicle at each predetermined time while the measurement beam PL scans the entire detection target area in front of the vehicle, the data of the plurality of images obtained at the predetermined times are stored in the image memory 14 in association with the respective projection angles.

The measurement beam PL irradiates the detection target area in such a predetermined pattern that the projection angle $\alpha$ changes in steps. To measure distances to various detection objects within the detection target area, normally, it is only necessary to project the measurement beam PL so that the projection angle $\alpha i$ changes from $\alpha 1$ to $\alpha I$ once.

FIG. 5 shows a control unit CU which controls operations of the light projection apparatus 1 and image pick-up apparatus 2 and processes the image signals of the image pick-up apparatus 2 to detect the detection object in front of the vehicle. The control unit CU is a control circuit including a random access memory (RAM), a read only memory (ROM), a central processing unit (CPU), peripheral circuits, and the like. The control unit CU executes various types of processing described later through computer software. The control unit CU can be implemented by a combination of hardware logic circuits including application specific integrated circuits (ASIC), field programmable gate arrays (FPGA), and the like.

The control unit CU includes: a drive control unit 31 integrally controlling an operation of the entire system; a distance calculation unit 32; a multiple reflection judgment unit 33; a reflection object distance operation unit 34; and a distance information combining unit 35.

The drive control unit 31 sends the light projection signal T1 and camera control signal T2 to the light projection apparatus 1 and image pick-up apparatus 2, respectively. Upon receiving the camera control signal T2 from the drive control unit 31, the image pick-up apparatus 2 starts image pick-up of the area in front of the vehicle. When the light projection signal T1 is sent from the drive control unit 31 to the light projection apparatus 1, the measurement beam PL is emitted from the light projection unit 1, and the mirror 8 is rotated, thus allowing the measurement beam PL to scan the area in front of the vehicle. The image signal sj(t) created from an image picked up by the image pick-up element in synchronous with the scanning with the measurement beam PL, that is, an image signal of an image picked up when the measurement beam PL is projected at the arbitrary projection angle $\alpha i$ is once stored in the memory 14. Thereafter, the image signal is sent to the distance calculation unit 32 and recorded on an image signal memory of the distance calculation unit 32.

The drive control unit 31 supplies a light projection information signal T3 to the distance calculation unit 32. The light projection information signal T3 includes information of the projection angle $\alpha i$ of the measurement beam PL. When the light projection information signal T3 is inputted in the distance calculation unit 32, the image signal (pixel signal string) representing an image which is picked up at the projection angle $\alpha i$ and stored in the image memory 14 is loaded on the image signal memory. In the image data corresponding to the projection angle $\alpha i$, a pixel PXj having a highest signal level among the image signal sj(t) of each line is specified to obtain the shooting angle $\gamma j$ of the reflected light from the detection object at the projection angle $\alpha i$. These angles $\alpha i$ and $\gamma j$ are assigned to the projection angle $\alpha$ and shooting angle γ in the equation (1), respectively, thus calculating the distance d1j to the detection object picked up by the pixel PXj (shooting angle γj).

The image signals of pixels in the other lines are processed in a similar way to the image signals sj(t) of the pixels PXj. Accordingly, the plurality of pixel regions having a brightness not less than a predetermined brightness are extracted in the single image, thus calculating the distances.

Herein, a description is given of a situation where substantially all of the measurement beam PL emitted from the light projection apparatus 1 of FIG. 4 is specularly reflected at a first point on the detection object, for example, and then substantially all of the specularly reflected measurement beam PL is scattered on a second point on the same or another detection object or on the road surface and is incident onto the image pick-up apparatus 2. In other words, the measurement beam PL from the light projection apparatus 2 is picked up (received) by the image pick-up element 2 after passing a plurality of reflection points. The reflecting way in which the measurement beam PL is specularly reflected once or more between projection from the light projection apparatus 1 and incidence onto the image pick-up apparatus 2 is called multiple reflection. The reflected light picked up by the image pick-up apparatus 2 through a plurality of reflection points is called a multiple reflected light.

When there is multiple reflected light specularly reflected at the first point, the reflected light is hardly incident onto a pixel on an axis connecting the first point and the center of the objective lens of the image pick-up apparatus 2, that is, a pixel supposed to receive the reflected light from the first point. Accordingly, the equation (1) cannot provide real distance information of the first point.

The distance calculation unit 32 calculates the distance di to the detection object based on the equation (1) using the pixel PXj (shooting angle γj) specified in each image picked up when the measurement beam is projected at the arbitrary projection angle αi. The distance calculation unit 32 creates a table shown in FIG. 6 and stores the projection angle αi, the pixel PXj (shooting angle γj) and the distance d1 in association with each other in an image.

The multiple reflection judgment unit 33 of the control unit CU of FIG. 5 judges the presence of multiple reflection based on data of the distance information table of FIG. 6 supplied from the distance calculation unit 32. In the example of the table of FIG. 6, the same pixel PX6 is stored in association with the projection angles α3 and α15, and it is therefore judged that there is multiple reflection (once or more specular reflection). The reflection object distance operation unit 34 calculates the distance to at least one of the reflection points of the multiple reflected light based on the result of judgment of the presence of multiple reflection by the multiple reflection judgment unit 33. The multiple reflection judgment unit 33 supplies the information of the distance d in terms of the pixel PXj (shooting angle γj) whose received light is not subjected to multiple reflection directly to the distance information combining unit 35. The distance information combining unit 35 combines the distance information obtained by the distance calculation unit 32 and the distance information obtained by the reflection object distance operation unit 34.

The distance detection principle for multiple reflected light and operations of the multiple reflection judgment unit 33, reflection object distance operation unit 34 and distance information combining unit 35 are described in detail below. To detect a multiple reflected light, especially a multiple reflected light (double reflected light) which is substantially specularly reflected at first and scattered next to be incident onto the image pick-up apparatus 2, the difference between the reflectance of specularly reflected light (specular reflectance RM) and the reflectance of reflected light due to scattering (diffusion) (scattering rate RS), which are shown in FIGS. 7B and 7D, is utilized.

Figure 7A:
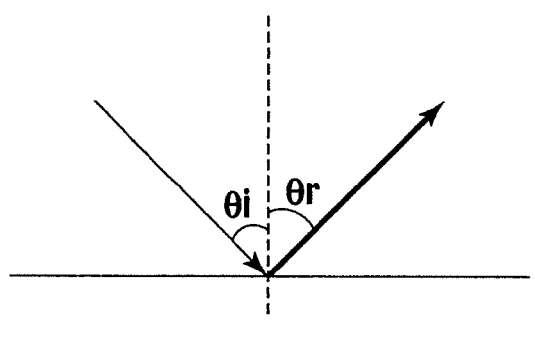
FIG. 7A is a view showing a relation between angles of incidence and reflection at specular reflection.
Figure 7B:
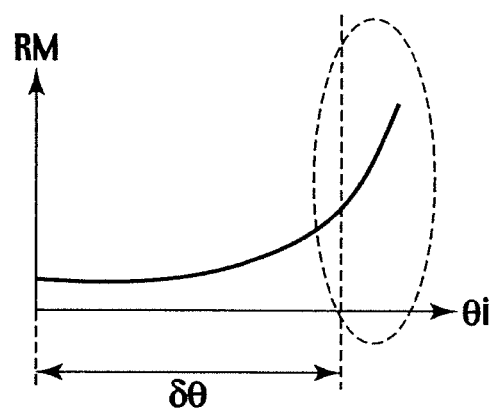
FIG. 7B is a diagram showing an example of specular reflectance.
Figure 7C:
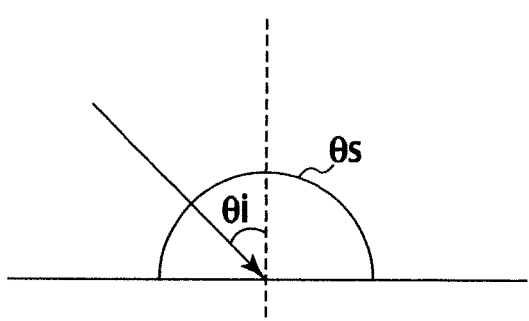
FIG. 7C is a diagram showing a relation between angles of incidence and scattering at scattering (diffusion)
Figure 7D:
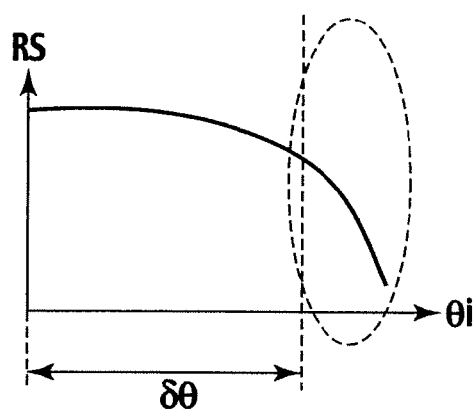
FIG. 7D is a diagram showing an example of scattering rate.

As for specularly reflected light whose angles θi and θr of incidence and reflection are equal to each other as shown in FIG. 7A, the specular reflectance RM as the reflectance of specularly reflected light increases as the angle θi increases as shown in FIG. 7B. On the other hand, as for the reflected light due to scattering (diffusion) reflected in substantially all directions θs for the angle θi of incidence as shown in FIG. 7C, the scattering rate RS as the reflectance thereof increases as the angle θi of incidence decreases as shown in FIG. 7D. The scattering rate on rough surfaces like road surfaces can be considered to be substantially constant independently of the angle θi of incidence.

The angle θi of incidence of the measurement beam from the vehicle MB onto a reflection member having a nearly mirror surface such as a rear bumper of a vehicle driving on the right or left lane or a front bumper of an oncoming vehicle is often within a predetermined range δθ of FIG. 7B (a low reflectance range). The specularly reflected light is therefore reduced, and the scattered light from the reflection member can be detected because of a large enough amount thereof. This allows the distance calculation unit 32 of FIG. 5 to accurately calculate the distances.

Figure 8A:
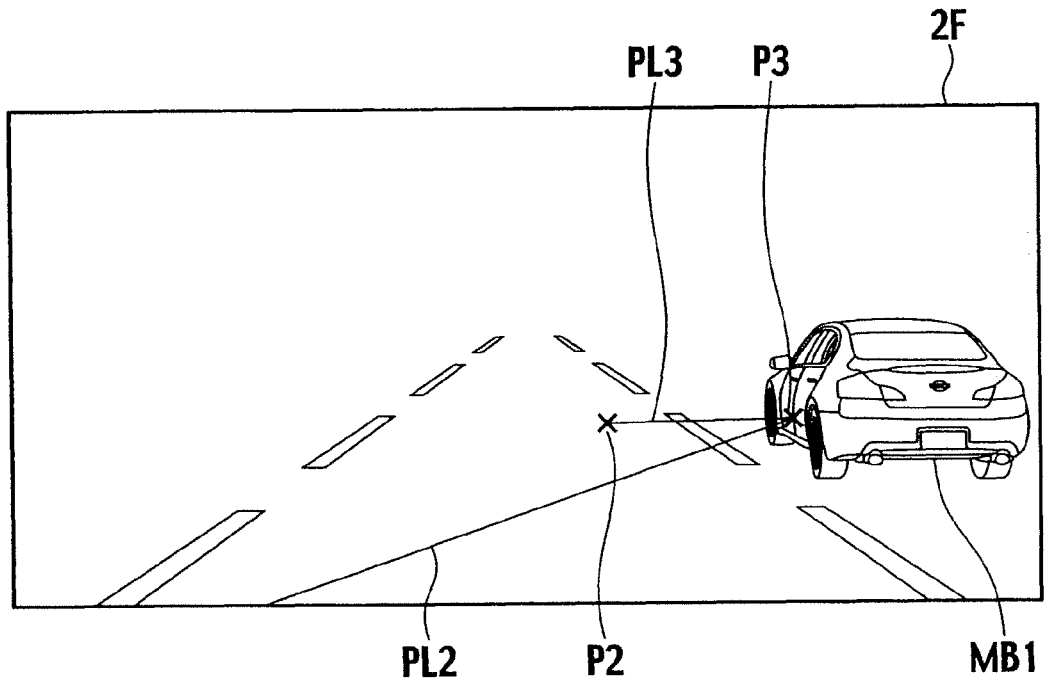
FIG. 8A is a view showing an example of an image in a camera field of view with a multiple reflected light being detected in the first embodiment.

On the other hand, a description is given of the situation where the vehicle MB1 driving on the adjacent lane is parallel to the vehicle MB of this embodiment as shown in the image 2F of FIG. 8A. In this situation, a measurement beam PL2 projected from the vehicle MB is incident onto a reflection point P3 on a nearly specular side surface of the vehicle MB1 at an angle out of a predetermined range δθ of FIG. 7D (a high scattering rate range). The scattered light from the reflection point P3 is therefore weak, and most of the measurement beam PL2 is specularly reflected. The measurement beam PL3 specularly reflected in such a manner is scattered at the point P2 on the road surface and is incident onto the image pick-up apparatus 2 as the multiple reflected light. Accordingly, an image of the point P2 is picked up by the image pick-up apparatus 2. The measurement beams PL2 and PL3 of FIG. 8A are not picked up by the image pick-up apparatus 2.

Figure 8B:
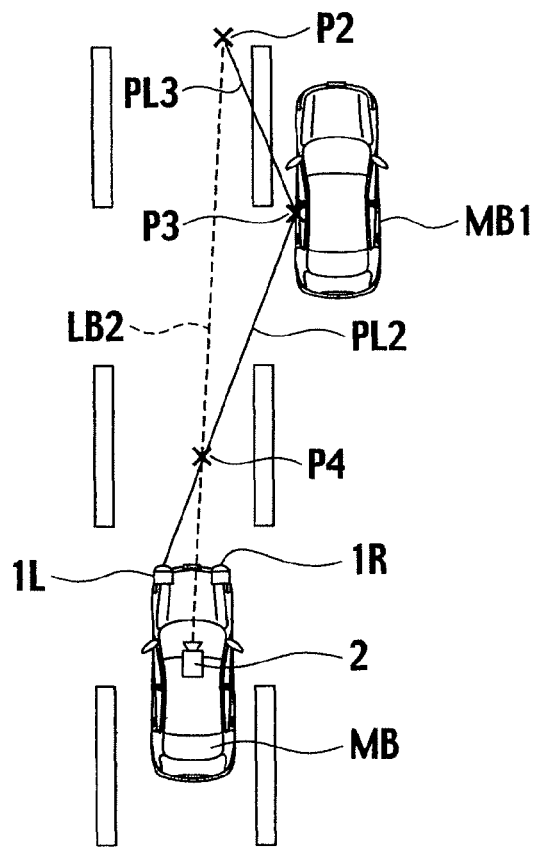
FIG. 8B is a plan view showing an arrangement in the outside of the vehicle in a state of FIG. 8A.

FIG. 8B is a plan view showing an arrangement in the outside of the vehicle corresponding to the image of an area in front of the vehicle which is shown in FIG. 8A. As shown in FIG. 8B, the measurement beam PL2 projected from the light projection apparatus 1 is first specularly reflected at the reflection point P3 in the side surface of the vehicle MB1 (as first reflection point or a reflection point closer to the image pick-up apparatus 2). Thereafter, the measurement beam PL2 is scattered at the point P2 (a second reflection point) on the road surface and is incident onto the light pick-up apparatus 2 as the multiple reflected light LB2 (herein, a double reflected light).

Figures 9A, 9B:
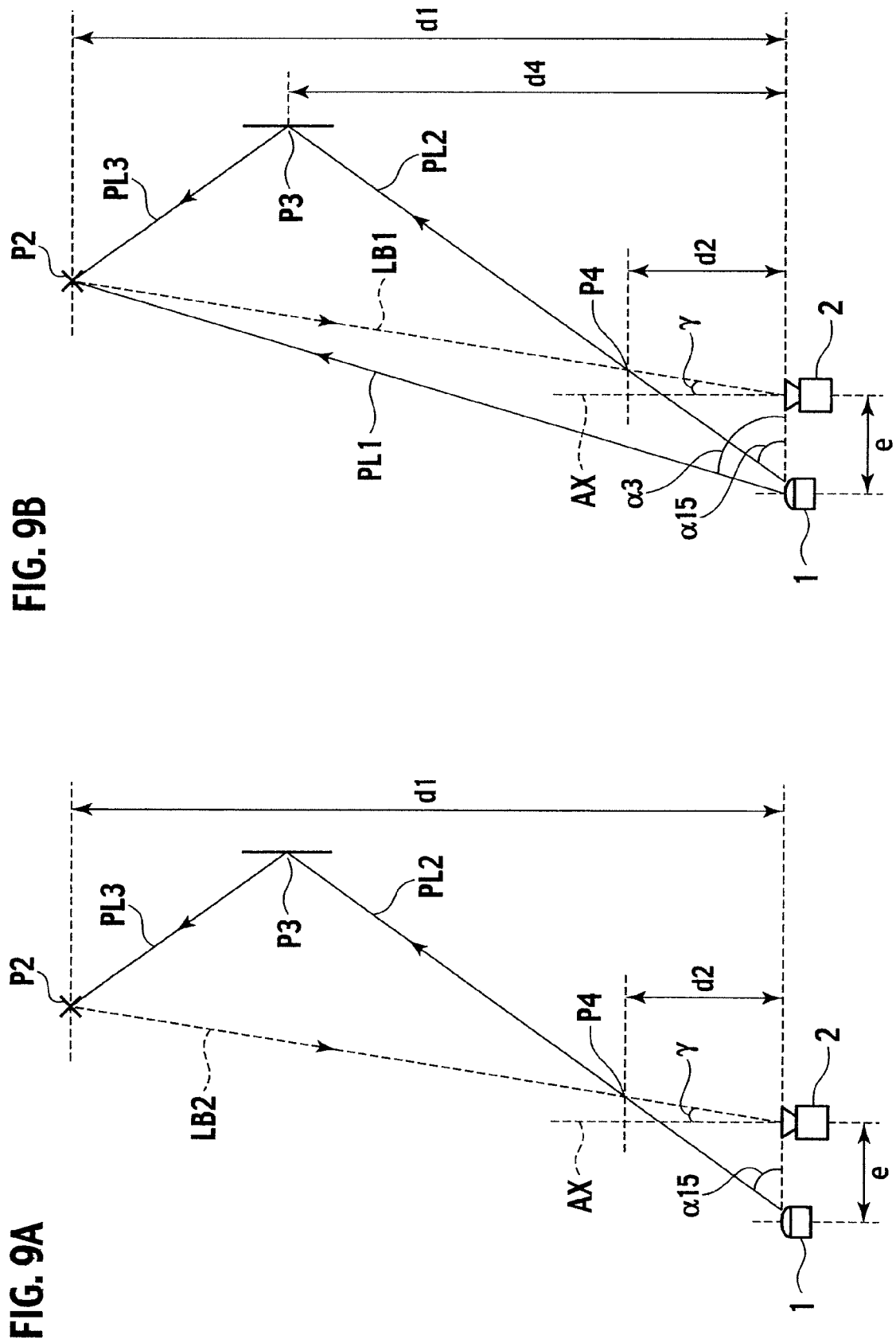
FIG. 9A is a view showing an example of a light path of a multiple reflected light.
FIG. 9B is a view showing a relation between two reflection points of the multiple reflected light projection angle of a measurement beam from a light projection apparatus, and a shooting angle of an image pick-up apparatus.

A description is given of a method of calculating the distance to the reflection point P3 in the side surface of the vehicle MB1 while such multiple reflection is caused with reference to FIGS. 9A and 9B. In this case, the measurement beam PL from the light projection apparatus 1 of FIG. 4 is moved counterclockwise for scanning.

As shown in FIG. 9A, when the projection angle of the measurement beam PL2 becomes α15, multiple reflection is caused at the reflection points P3 and P2, and the multiple reflected light LB2 from the point P2 is incident onto the image pick-up apparatus 2. The pixel corresponding to the shooting angle γ is assumed to be a pixel PX6. In this case, in the distance information table of FIG. 6, the pixel having the maximum pixel value for the projection angle α15 is recorded as the pixel PX6 (shooting angle γ). The distance d2 is calculated by the distance calculation unit 32 based on the equation (1) using the shooting angle γ and projection angle α15. The distance d2 is then expressed by the following equation (2) and recorded as the distance d2 for the projection angle α15 in the distance information table of FIG. 6.

$$d2 = e \cdot \left( \frac{\sin\alpha15 \cdot \cos\gamma}{\cos(\alpha15 + \gamma)} \right) \quad (2)$$

The distance d2 is a distance between the image pick-up apparatus 2 and a virtual point P4 at which the measurement beam PL2 and multiple reflected light LB2 intersect each other. The virtual point P4 is located closer to the image pick-up apparatus 2 than the reflection point P3 of FIG. 9A.

Subsequently, when the measurement beam PL2 further moves counterclockwise for scanning, the projection angle of the measurement beam PL1 becomes α3 (α3>α15) as shown in FIG. 9B. In this case, the measurement beam PL1 is directly projected onto the point P2 the same as the case of FIG. 9A. The reflected light LB1 from the point P2 due to scattering is therefore incident onto the image pick-up apparatus 2 at the shooting angle γ. In the distance information table of FIG. 6, the pixel having the maximum pixel value for the projection angle α3 is recorded as the pixel PX6 (shooting angle γ). Moreover, the distance d1 which is calculated based on the equation (1) by the distance calculation unit 32 of FIG. 5 using the shooting angle γ and projection angle α is also recorded as the distance di in the distance information table of FIG. 6. The distance d1 (d1>d2) is the distance between the image pick-up apparatus 2 and the point P2 at which the measurement beam PL1 and reflected light PL3 intersect each other in FIG. 9A.

The multiple reflection judgment unit 33 performs judgment based on the information of the distance information table of FIG. 6 as follows. Specifically, when the projection angle or distance has two or more different values for the same pixel PX6 (shooting angle γ), like the projection angles α3 and α15 or the distances d1 and d2, it is judged that any one of the reflected light beams incident onto such a pixel is subjected to multiple reflection, that is, subjected to once or more specular reflection. Furthermore, the multiple reflection judgment unit 33 judges that the shorter distance d2 (data obtained at the smaller projection angle α15) among the distances d1 and d2 obtained in the distance calculation unit 32 is obtained by incorrect calculation because of multiple reflection. This means that the detected multiple reflected light is reflected far by the first specular reflection and then received by the image pick-up apparatus 2 by second scattering, for example.

The multiple reflection judgment unit 33 sends information of the projection angles α3 and α15, shooting angle γ, and the distances d1 and d2, which are obtained when the multiple reflection occurs, to the reflection object distance operation unit 34. The information of the distances di of pixels (shooting angles) whose incident beams are judged not to be subjected to multiple reflection is sent to the distance information combining unit 35. The reflection object distance operation unit 34 calculates the distance d4 between the image pick-up apparatus 2 and a first reflection point (the closer reflection point) P3 of the multiple reflection of FIG. 9B based on the information received from the multiple reflection judgment unit 33.

In this embodiment, the surface including the reflection point P3 (a side surface of the vehicle MB1) is assumed to be parallel to the vehicle MB. The distance d4 is calculated from the following equation (3) using the calculated distance d1 to the farther point P2 of FIG. 9B and the two projection angles α3 and α15 (α3>α15) of the measurement beam from the light projection apparatus 1 judged to be subjected to multiple reflection. The calculation of the equation (3) utilizes specular reflection (regular reflection) of the measurement beam PL at the reflection point P3.

$$d4 = \frac{d1}{2}\left(1 + \frac{\tan\alpha3}{\tan\alpha15}\right) \quad (3)$$

The distance d4 is stored in the distance information table of FIG. 6 as a reflection object distance dr in association with the projection angle α15 and distance d2. The distance information on the projection angle α15 which includes the distance d4 to the reflection point P3 of the multiple reflection is supplied from the reflection object distance operation unit 34 of FIG. 5 to the distance information combining unit 35.

The distance information combining unit 35 combines the distance information of the reflection object distance dr to the reflection point which is sent from the multiple reflection judgment unit 33 and the distance information di sent from the reflection object distance operation unit 34 to create distance information on the detection object within the detection target area. Specifically, in the distance information combining unit 35, information on the first distance di to the detection object not causing multiple reflection and the second distance dr to the detection object causing multiple reflection can be obtained.

Figure 10:
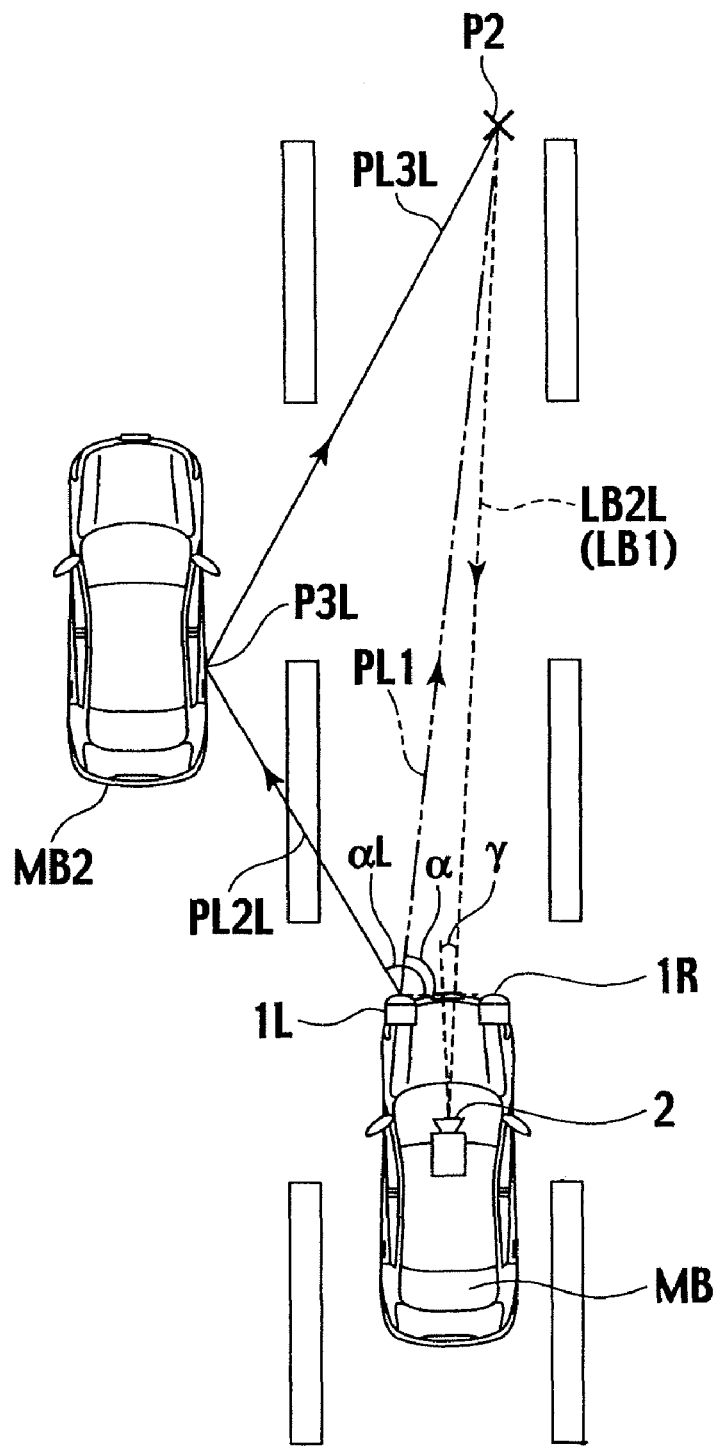
FIG. 10 is a plan view showing another example of a multiple reflected light.

The above description is given of the case where the measurement beam is projected at the projection angle α15 from the light projection apparatus 1 to the reflection point P3 on the side surface of the vehicle MB1 driving on the right lane. As shown in FIG. 10, the same is applied to the case where a measurement beam PL2L from the light projection apparatus 1 is projected at a projection angle αL to a reflection point P3L in the side surface of the vehicle MB2 driving on a lane left to the vehicle MB. A brief description thereof is given below.

In FIG. 10, in some cases, the measurement beam PL3L specularly reflected at the reflection point P3L reaches the point P2 on the road surface, and the multiple reflected light LB2L scattered at the point P2 is incident onto the image pick-up apparatus 2 at the shooting angle γ. When the measurement beam PL1 emitted from the light projection apparatus 1 at the projection angle α (α<αL) is projected to the point P2, the reflected light LB1 thereof is incident onto the image pick-up apparatus 2 at the same shooting angle γ.

In this case, the calculation of the distance d1 using the projection angle α is performed in the similar way as that of the example of FIG. 9A, but the measurement beam PL2L and multiple reflected light LB2L do not intersect on each other. Accordingly, when the distance d1 is calculated using the equation (1) for the projection angle αL, the distance d1 becomes a negative impossible value. The distance calculation unit 32 of FIG. 5 therefore determines that the distance cannot be calculated. In the distance information table of FIG. 6, the distance d1 is recorded as the distance data for the projection angle α, but error information representing that the distance cannot be calculated is recorded in the distance data field corresponding to the projection angle αL.

Thereafter, based on the contents of the distance information table, the multiple reflection judgment unit 33 judges that the reflected light incident onto the pixel having a maximum brightness when the measurement beam is projected at the projection angle αL is subjected to multiple reflection. The reflection object distance operation unit 34 can calculate the distance to the closer reflection point P3L of the multiple reflection in FIG. 9 (a distance corresponding to d4 of FIG. 9B) by assigning l tan αLl and tan α to tan α3 and tan α15 of the equation (3), respectively.

Figure 11:
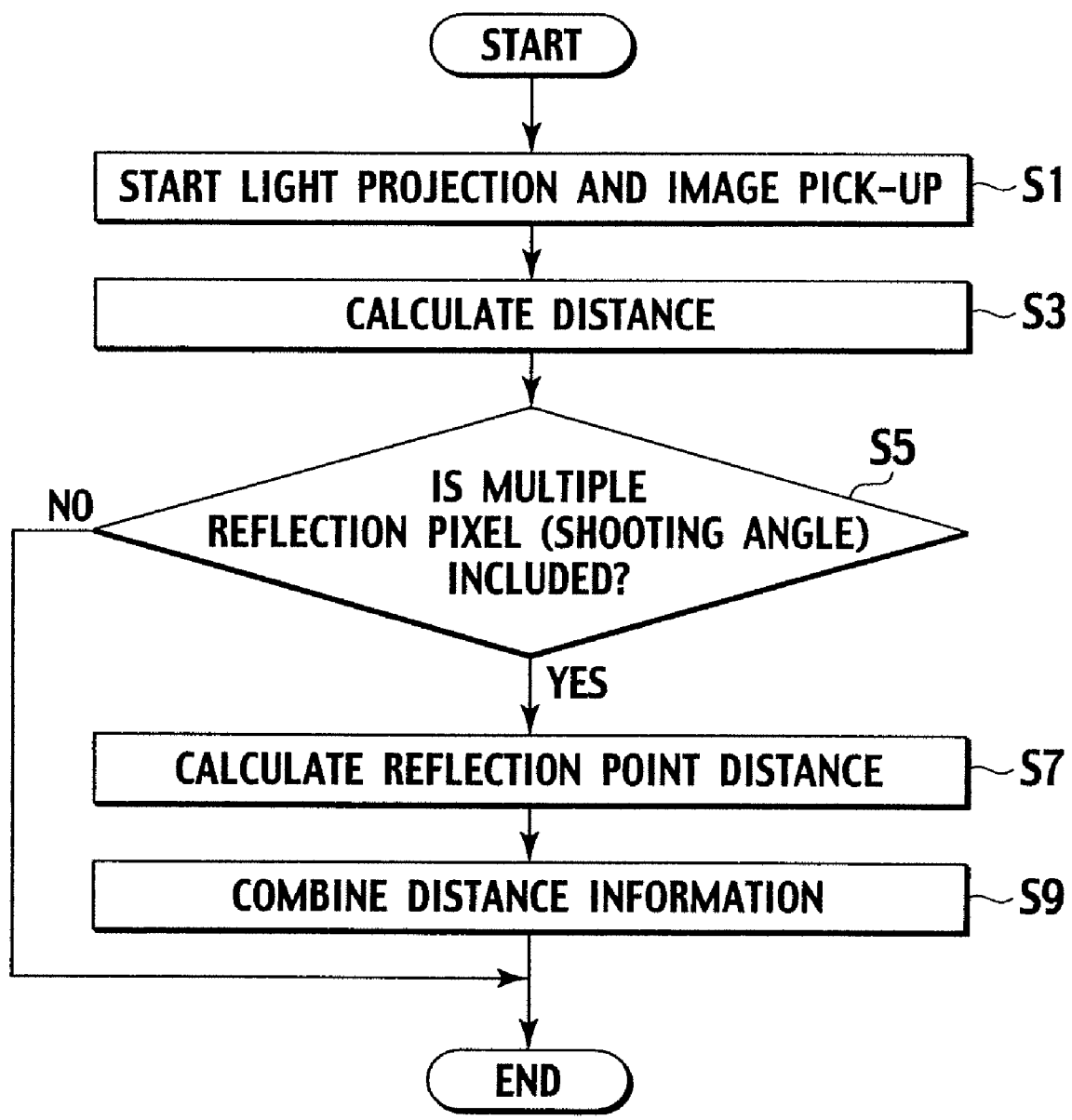
FIG. 11 is a flowchart showing an example of a distance measurement operation in the first embodiment.

Next, a brief description is given of an example of the operation to calculate the information of distance to the detection object within the detection target area in this first embodiment with reference to a flowchart of FIG. 11. This operation is controlled by the drive control unit 31 within the control unit CU of FIG. 5.

In step S1 of FIG. 11, the light projection signal T1 and camera control signal T2 are inputted into the light projection apparatus 1 and image pick-up apparatus 2 from the drive control unit 31 of FIG. 5, and scanning (light projection) with the measurement beam PL by the light projection apparatus 1 of FIG. 4 and image pick-up of the reflected light LB by the image pick-up apparatus 2 are started in synchronous with each other. The pixel PXj having a maximum pixel value is calculated for each projection angle α. In step S3, the distance calculation unit 32 calculates the distance di based on the equation (1) using the projection angle αi and shooting angle γj in association with the pixel having a maximum pixel value. Such information is stored in the distance information table of FIG. 6.

In step S5, the multiple reflection judgment unit 33 judges the presence of multiple reflection with reference to the distance information of FIG. 6. In this embodiment, the presence of the multiple reflection is judged by:

(a) whether some of the pixels with maximum pixel values corresponding to different projection angles αi are the same; or (b) whether the distance calculated for the same pixel has different values. When there is no multiple reflection, or when there is no pixel having a maximum pixel value due to multiple reflection, only data of the distance di (first distance) of the distance information table is sent to the distance information combining unit 35. In step S5, when there is multiple reflection, or when there is a pixel having a maximum pixel value due to multiple reflection, the shooting angle γ among the information of the pixel is supplied to the reflection object distance operation unit 34, and the information of the other pixels is supplied to the distance information combining unit 35.

In step S7, using the equation (3), the reflection object distance operation unit 34 calculates the distance dr (second distance) to the point (real reflection point), at which the first reflection occurs, for the pixel having a maximum pixel value due to multiple reflection. The reflection object distance operation unit 34 supplies the calculated distance dr to the distance information combining unit 35. In next step S9, the distance information combining unit 35 combines the calculated distance information (first distance) at a multiple reflection point and the distance information (second distance) with no multiple reflection to calculate distance information of the detection target area.

According to the distance measurement system and vehicle of this embodiment, the following operational effects can be obtained.

(1) When the reflected light is judged by the multiple reflection judgment unit 33 to be specularly reflected light, the information of distance to the first real reflection point of the measurement beam emitted from the light projection apparatus can be calculated by the reflection object distance operation unit 34 based on the information of the projection angle of the measurement beam PL and the information of the pixels PXj receiving the reflected light. It is therefore possible to calculate the distance to the detection object located such a position that increases the specular reflectance, which could not measured before, thus expanding the range where accurate distance information can be obtained within the detection target area.

(2) In a plurality of images obtained at different projection angles, when two different distances are computed for the same pixel, it is judged that an image signal created by the multiple reflected light is included. Accordingly, it is unnecessary to assign space codes to irradiation light unlike the distance measurement unit of the conventional art.

(3) The presence of multiple reflection is judged based on whether at least two distances are calculated for the same pixel or whether error information is recorded for one of the calculated distances from the calculation results of the distance calculation unit which is essential to the distance measurement unit. This eliminates the need for a special algorithm to judge the presence of multiple reflection.

(4) The distance measurement system of this embodiment further includes the distance information combining unit 35 which combines information of the distance (first distance) to the reflection point of the reflected light not subjected to multiple reflection which is obtained by the distance calculation unit 32 and the information of distance (second distance) to the closest reflection point of the multiple reflected light which is obtained by the reflection object distance operation unit 34. Accordingly, it is possible to accurately measure distances to a plurality of detection objects located anywhere in the entire detection target area.

(5) When the detection object is a vehicle driving on the road surface and the multiple reflected light is light reflected on the road surface subsequent to the vehicle, the multiple reflected light from the side surface of the vehicle driving on the side lane can be surely detected. It is therefore possible to measure distance to the reflection point of multiple reflected light (i.e. vehicle) in a wide range of environment.

(6) The vehicle MB of the aforementioned embodiment includes the distance measurement system of the aforementioned embodiment. The light projection apparatus 1 projects the measurement beam PL towards the area in front of the vehicle MB as the detection target area, and the image pick-up apparatus 2 can receive the reflected light from the area in front of the vehicle MB. It is therefore possible to eliminate the influence of multiple reflected light and accurately measure distance to the detection object in front of the vehicle MB.

Second Embodiment

A description is given of a second embodiment of the present invention with reference to FIGS. 12 to 15. The aforementioned first embodiment shows the example where the reflection surface causing multiple reflection (a side surface of the vehicle MB1) is parallel to the vehicle MB (see FIG. 8B). The second embodiment is configured to accurately measure the distance to a reflection point of multiple reflected light even when the reflection surface (the side surface of the vehicle MB1) causing multiple reflection is not parallel to the vehicle MB. Hereinafter, a description is given of the case where the reflection surface (the side surface of the vehicle MB1) causing multiple reflection is not parallel to the vehicle MB using FIGS. 12 to 15. Some portions of FIGS. 12 to 15 corresponding to those of the FIGS. 5, 7, 8B, and 10 are given same reference numerals or symbols.

Figure 12:
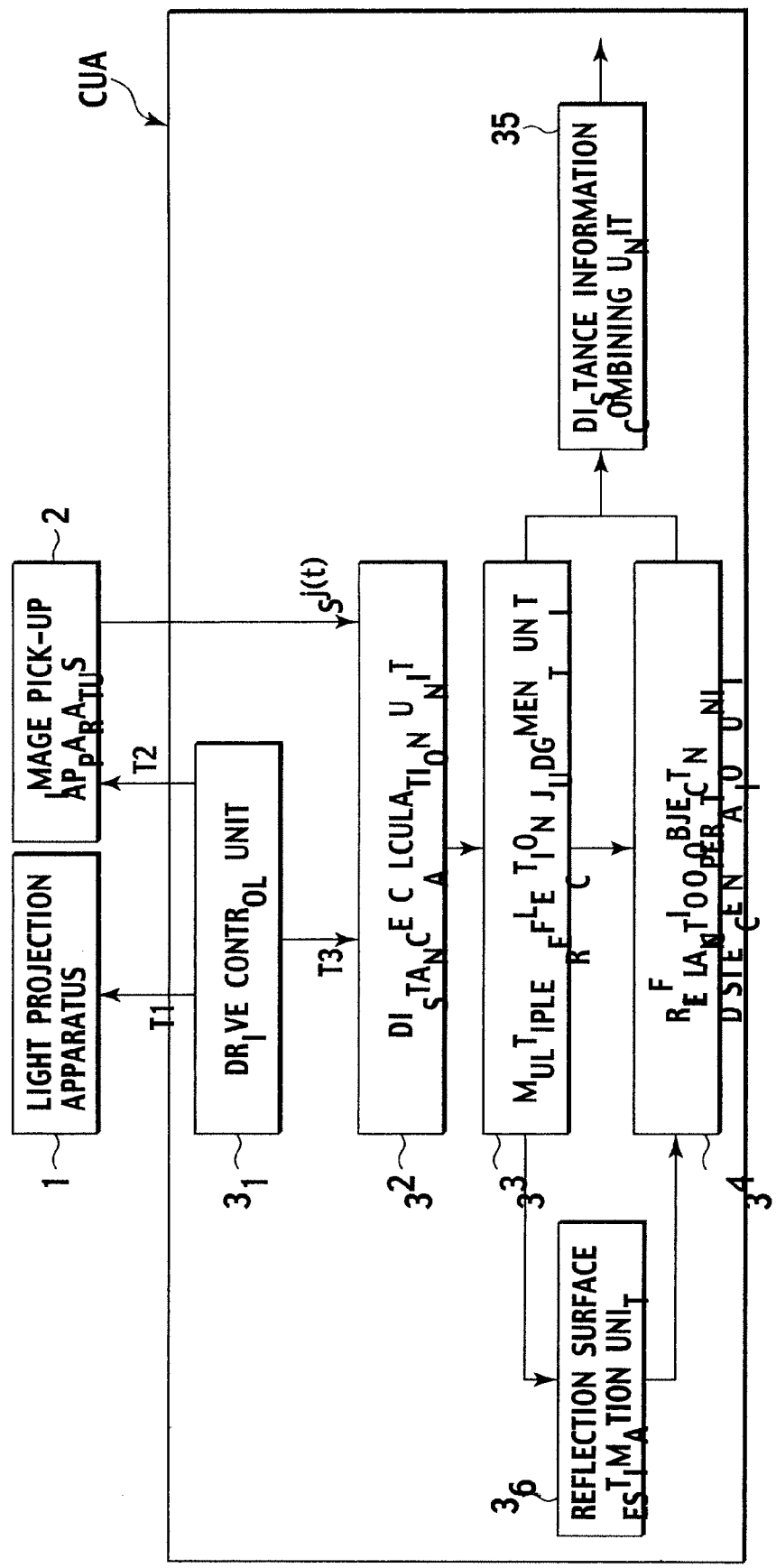
FIG. 12 is a block diagram showing a configuration of a control unit of a distance measurement system of a second embodiment of the present invention.

FIG. 12 shows a control unit CUA of the distance measurement system of this embodiment. The control unit CUA is different from the control unit CU of FIG. 5 in a reflection surface estimation unit 36. The following description is mainly given of the operation of the reflection surface estimation unit 36 and the operation of the reflection object distance operation unit 34 related thereto. The distance calculation unit 32 creates the distance information table shown in FIG. 6 in the same manner as the first embodiment.

Figure 13:
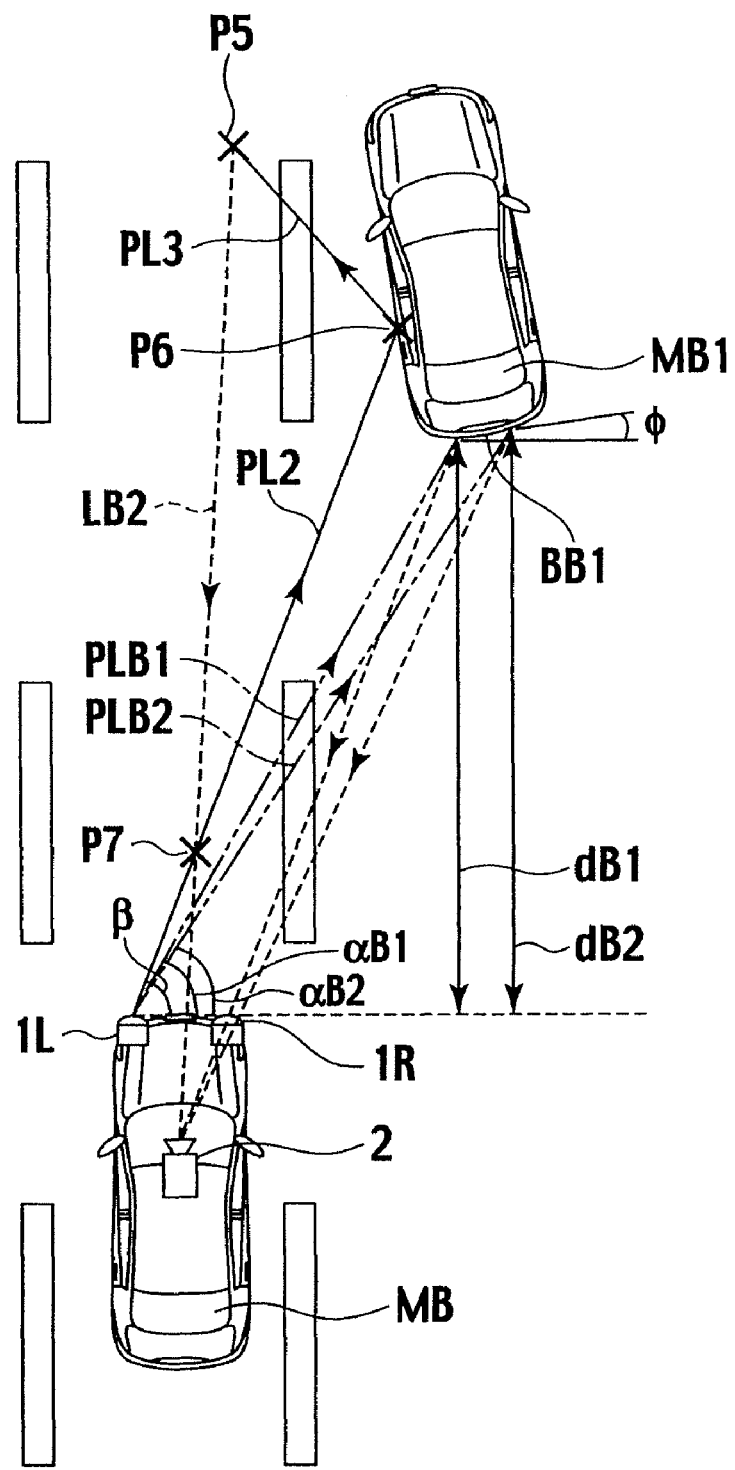
FIG. 13 is a plan view showing an arrangement of vehicles during detection of a multiple reflected light.

FIG. 13 is a plan view showing an example in which another vehicle MB1 is driving in right front of the vehicle MB, on which the distance measurement system of this embodiment is mounted, not in parallel to the vehicle MB. As shown in FIG. 13, a measurement beam PL2 projected from the light projection apparatus 1 to a reflection point P6 in the side surface of the vehicle MB1 at projection angle β is specularly reflected at the reflection point P6, incident to a point P5 on the road surface to be scattered, and then incident to the image pick-up apparatus 2 as a multiple reflected light LB2. At this time, the reflection surface including the reflection point P6 is not parallel to the vehicle MB.

Like the first embodiment, two distances are calculated along the light path of the multiple reflected light LB2 to the point P5 and a virtual point P7. Accordingly, the multiple reflection judgment unit 33 of FIG. 12 judges that there is multiple reflection also in the case of FIG. 13.

Figure 14:
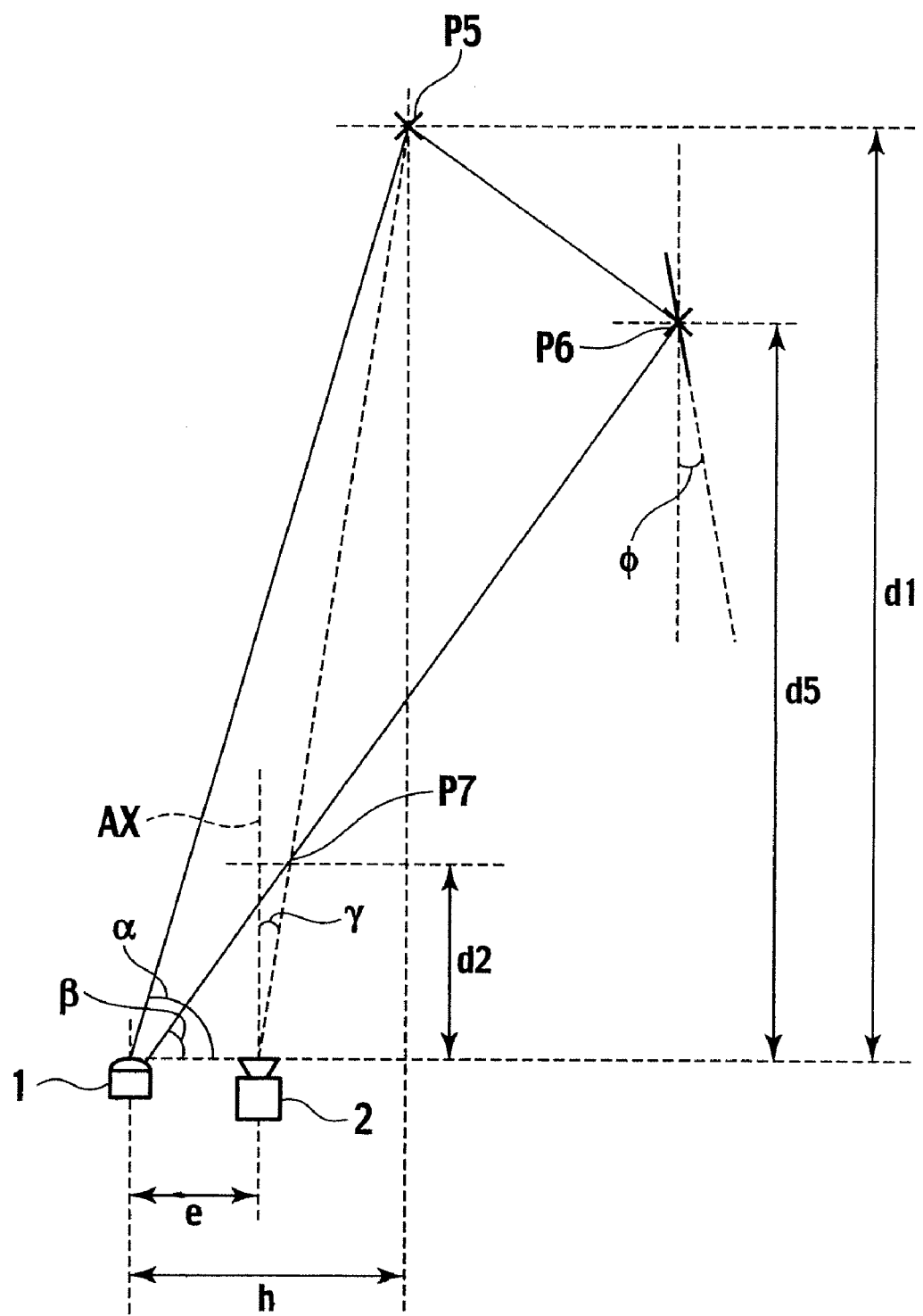

FIG. 14 schematically shows a state of FIG. 13. In FIG. 14, in two images picked up with the measurement beam projected at two projection angles α and β, the reflected lights reflected at the point P5 are incident onto a same pixel of the image pick-up apparatus 2. In other words, in a plurality of images picked up during one scan from the projection angle α1 to αj, a same pixel is specified as the pixel having a maximum pixel value in some of the images. In FIG. 14, the shooting angle of the reflected light incident to this pixel is indicated by γ. In this case, as described in the first embodiment, for the same pixel receiving the reflected lights at the same shooting angle γ in different two images, the distance d1 to the point P5 (projection angle α) and the distance d2 to the virtual point P7 (projection angle β) are calculated. Accordingly, the multiple reflection judgment unit 33 of FIG. 12 judges that there is multiple reflection. The multiple reflection judgment unit 33 sends the presence of multiple reflection, the distance d1, which is the largest among the distances d1 and d2, and the projection angles α and β to the reflection surface estimation unit 36 and reflection object distance operation unit 34.

Herein, a description is given of the reflection surface estimation unit 36 in the case where multiple reflection is caused in the situation shown in FIG. 13 as an example. As shown in FIG. 13, the measurement beam PL2 is incident onto the side surface of the vehicle MB1. Since the angle of incidence of the measurement beam PL2 is large, the specular reflection component is dominant at the reflection point P6. However, on a rear bumper BB1 of the vehicle MB1, the angle of incidence of the measurement beam from the light projection apparatus 1 is small. Accordingly, the scattering component is dominant on the rear bumper BB1, and the reflected measurement beam can be directly detected. It is therefore possible to calculate the distance to the rear bumper BB1 by triangulation using the aforementioned equation (1).

With reference to the distance information table of FIG. 6, the reflection surface estimation unit 36 identifies a reflection member which appears to be a rear bumper in an area around the reflection point which is judged to cause multiple reflection in the situation of FIG. 13. Specifically, the region in which pixels having high brightness are located on a rectangle horizontally extended is identified as the rear bumper BB1. Thereafter, for example, based on the information related to pixels of images around both ends of the reflection member which are picked up by the image pick-up apparatus 2, projection angles αB1 and αB2 of the measurement beams PLB1 and PLB2 from the light projection apparatus 1 scanning around the both ends and distances dB1 and dB2 are specified. The reflection surface estimation unit 36 can calculate the angle φ of inclination of the reflection member based on the difference between the distances dB1 and dB2 and the interval between the both ends of the reflection member to which the distances dB1 and dB2 are calculated.

Moreover, it is possible to obtain an average of angle φ of inclination of the reflection member (rear bumper BB1) by using the information of distance in a range of projection angle αB1 to αB2. Furthermore, when it is assumed that the surface of the vehicle MB1 including the reflection point P6 causing multiple reflection is orthogonal to the rear bumper BB1, the surface including the reflection point P6 is estimated to have an angle of inclination equal to the angle φ. The information of this angle φ of inclination is supplied to the reflection object distance operation unit 34 of FIG. 12.

The reflection object distance operation unit 34 calculates a distance h between the light projection apparatus 1 and point P5 on the road surface in the vehicle width direction from the calculated distance d1 to the point P5, the shooting angle γ of the point P5, and distance e and then calculates the distance d5 to the reflection point P6 on the inclined surface using the calculated distance h. The distance d5 is calculated based on the following equation (4) using the shooting angle γ, the angle φ of inclination of the surface including the reflection point P6, the calculated distances d1 and d2 to the points P5 and P7, the projection angles α and β of the measurement beam from the light projection apparatus 1 to the points P5 and P7, and the interval e.

$$d5 = \frac{(d1 - d2)\tan\beta}{1 + \tan(\alpha - 2\phi)} + \tan\alpha \cdot (d1 \cdot \tan\gamma + e) \quad (4)$$

The information of the calculated distance d5 to the reflection point P6 is sent to the distance information combining unit 35 of FIG. 12, thus obtaining distance information of the detection target area, that is, the first distance to a detection object not causing multiple reflection and the second distance to a detection object causing multiple reflection.

Figure 15:
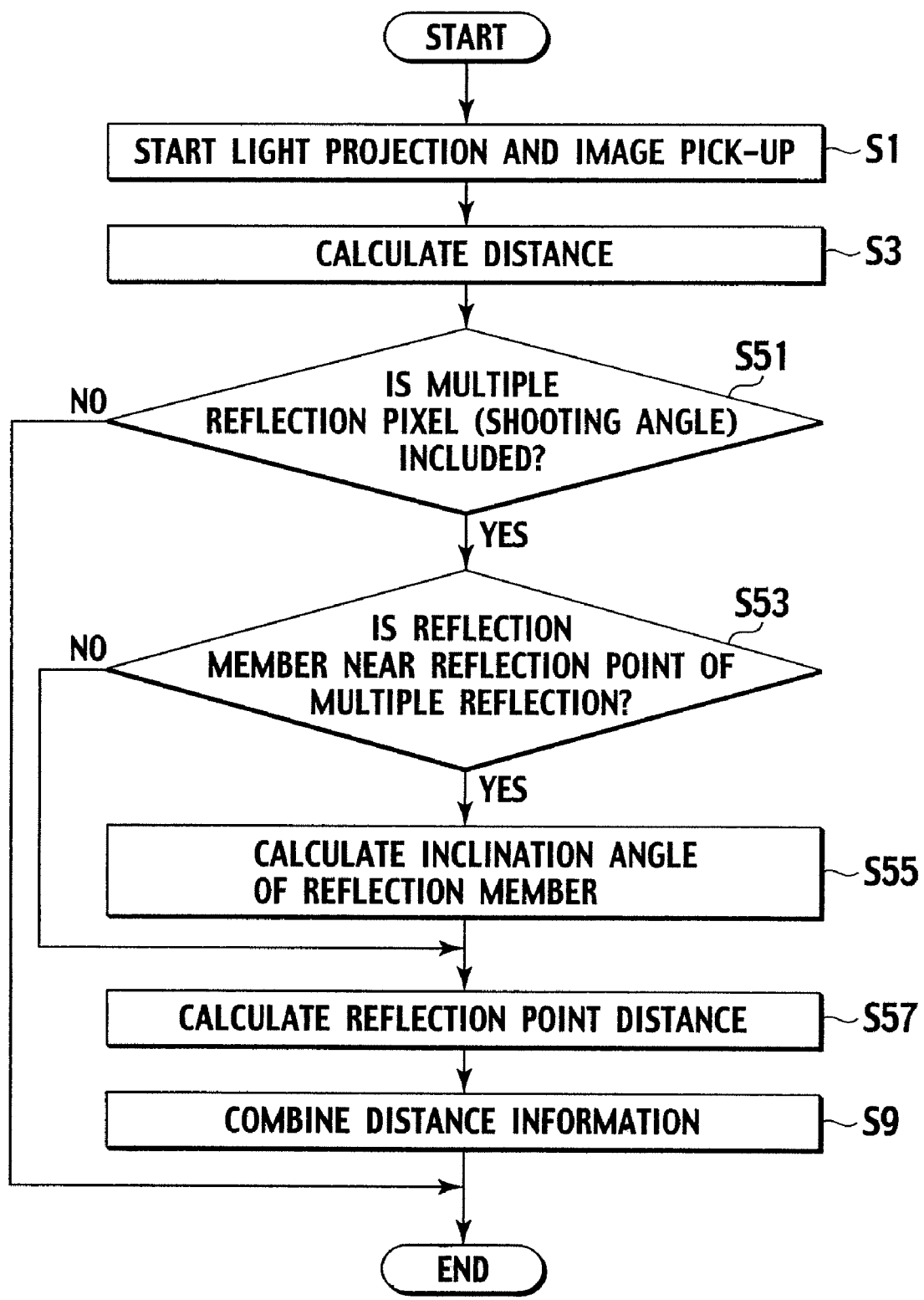
FIG. 15 is a flowchart showing an example of a distance measurement operation in the second embodiment.

A description is given of an example of the operation to calculate the distance information of the detection target area in the second embodiment with reference to a flowchart of FIG. 15. This operation is controlled by the drive control unit 31 of the control unit CUA of FIG. 12.

The steps S1 and S3 of FIG. 15 are the same as those of FIG. 11. In the step S3, the distance calculation unit 32 calculates the distance di based on the equation (1) using the projection angles αi and the shooting angles γ in association with pixels having maximum pixel values. The information is stored as the distance information table of FIG. 6. When it is judged in step S51 that there is no multiple reflection, the contents of the distance information table are directly sent to the distance information combining unit 35. When it is judged in the step S51 that there is multiple reflection, the operation proceeds to step S53.

In the step S53, the reflection surface estimation unit 36 evaluates whether there is a reflection member shaped like a predetermined rear bumper near the reflection point of the multiple reflection. When there is no reflection member, the angle of inclination of the surface including the reflection point of the multiple reflection is determined to be zero, and the operation proceeds to step S57. On the other hand, when there is the reflection member in the step S53, the operation proceeds to step S55, and the reflection surface estimation unit 36 calculates the angle $\phi$ of inclination of the reflection member as described above and sends the information of the angle $\phi$ of inclination to the reflection object distance operation unit 34. In the step S57, the reflection object distance operation unit 34 calculates the distance to the reflection point of the multiple reflection based on the equation (4) and sends the same to the distance information combining unit 35. In step S9, the distance information combining unit 35 combines the information of the calculated distance to the multiple reflection point and the information of the distance to the reflection point not causing multiple reflection to obtain distance information of every detection object located within the detection target area.

According to the distance measurement system of the second embodiment, the following operational effects can be obtained.

When it is judged by the multiple reflection judgment unit 33 that there is a multiple reflected light, the rectangular reflection member which appears to be a rear bumper is extracted near the reflection point of the multiple reflected light, and the angle $\phi$ of inclination of the reflection member in a plan view is calculated. The distance d5 to the reflection point P6 on the side surface (inclining surface) of the vehicle MB1 driving on the right lane in front of the vehicle is calculated with the angle of the reflection surface causing multiple reflection being set to the angle $\phi$ of inclination. It is therefore possible to calculate the distance d5 to the refection point P6 of the measurement beam causing multiple reflection while taking into consideration even the angle of inclination of the reflection surface onto which the measurement beam causing multiple reflection is incident.

The rear bumper of the vehicle can be easily detected because of the substantially rectangular shape and high reflectance of the same.

The second embodiment aforementioned can be modified as follows.

In the aforementioned second embodiment, the distance to the reflection point is calculated by setting the angle of inclination of the reflection surface of the reflection member. However, it is also possible to detect changes in angle of inclination of the reflection surface of the reflection member from the image information by the image pick-up apparatus 2 as follows.

When the angle of inclination of the reflection surface is changed, in the image obtained by the image pick-up apparatus 2 of FIG. 5, for example, the image of the reflection point (multiple reflection point) in the reflection surface changes in brightness. This is because changes in angle of incidence of the measurement beam onto the reflection point increases or decreases the specular reflection component. Accordingly, the angle $\phi$ of inclination of the reflection surface is estimated to be increased when the brightness of the reflected light obtained from the image information is reduced. This makes it possible to detect the reflection member having a surface intersecting with the driving direction of the vehicle MB at a predetermined angle of inclination.

On the other hand, as the brightness of the reflection angle increases, the angle $\phi$ of inclination of the reflection surface decreases. This allows estimation of changes in angle of inclination, thus providing the information of changes in angle of the reflection surface.

In the first embodiment, in terms of image data corresponding to the projection angle $\alpha i$, the distance calculation unit 32 specifies the pixel PXj having a highest signal level in the image signal sj(t) of each line and determines the shooting angle $\gamma j$ of the reflected light from the object to the image pick-up apparatus 2 for the light projection angle $\alpha i$. However, in the embodiment, the specification of the pixel PXj and the determination of the shooting angle $\gamma j$ may be individually performed by different units. For example, a specification unit may specify the pixel PXj, and a determination unit may determine the shooting angle $\gamma j$.

Furthermore, in the second embodiment, the reflection surface estimation unit 36 identifies a rectangular reflection member which appears to be a rear bumper near the reflection point of the multiple reflected light and then calculates the angle $\phi$ of inclination of the reflection member. However, in this embodiment, the specification of the reflection member and the calculation of the angle $\phi$ of inclination may be individually performed by different units. For example, an extraction unit may extracts the reflection member, and an inclination angle calculation unit may calculate the angle $\phi$ of inclination.

The aforementioned first and second embodiments show the examples in which the present invention is applied to the distance measurement systems mounted on vehicles. However, the present invention is not limited to this. The present invention can be applied to for example, other vehicles such as trains and ships, robots such as industrial, security, or nursing-care robots, and measurement systems mounted on mobile machines of industrial equipment and the like. Furthermore, the present invention can be applied to measuring instruments fixed and used (shape measurement apparatuses and the like) and the like.

Moreover, the light projected from the light projection apparatus is not limited to the measurement beam PL (irradiation light) shown in the aforementioned embodiments and may be any optimal light according to the applied equipment, detection target area, and detection object. For example, the irradiation light may be configured to just irradiate the whole detection target area. Such a configuration allows the distance to the reflection point of the multiple reflected light to be calculated.

Furthermore, the present invention is not limited by the aforementioned embodiments as long as the functions characteristic to the present invention are not damaged. Moreover, the aforementioned embodiments and modifications may be combined. For example, the distance measurement system according to the present invention may be configured to include: an projection apparatus which projects measurement beams at a plurality of projection angles towards a detection area; an image pick-up apparatus which picks up images of reflected lights corresponding to the measurement beams from the detection area, and outputs image signals; and a judgment unit which judges whether specular reflection is caused based on the image signals; an operation unit which, when it is judged that the specular reflection is caused, calculates a distance to a detection object causing the specular reflection using a first distance arithmetic expression (above equation (3)), and when it is judged that the specular reflection is not caused, calculates a distance to a point at which scattering is caused using a second distance arithmetic expression (above equation (2)).

The constituent elements of claims correspond to the constituent elements of the aforementioned embodiments as follows. Specifically, the judgment unit corresponds to the multiple reflection judgment unit 33; the operation unit corresponds to the reflection object distance operation unit 34 or distance calculation unit 32; and the inclination angle calculation unit corresponds to the reflection surface estimation unit 36.

The entire contents of a Japanese Patent Application No. P2007-310620 with a filing date of Nov. 30, 2007 and a Japanese Patent Application No. P2008-189690 with a filing date of Jul. 23, 2008 are herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. A distance measurement system, comprising:
   a projection apparatus which projects measurement beams at least at first and second projection angles towards a detection area;
   an image pick-up apparatus which picks up an image of a first reflected light and an image of a second reflected light from the detection area and outputs image signals, the first reflected light corresponding to the measurement beam projected at the first projection angle, and the second reflected light corresponding to the measurement beam projected at the second projection angle;
   a distance calculation unit which, based on the image signals, calculates a first distance to a first measurement point from a first incidence angle of the first reflected light onto the image pick-up apparatus, the first projection angle and an inter-apparatus distance between the projection apparatus and the image pick-up apparatus, and calculates a second distance to a second measurement point from a second incidence angle of the second reflected light onto the image pick-up apparatus, the second projection angle and the inter-apparatus distance;
   a judgment unit which judges that specular reflection is caused when the first incidence angle of the first reflected light is equal to the second incidence angle of the second reflected light; and
   an operation unit which, when it is judged by the judgment unit that the specular reflection is caused, calculates a distance to a detection object causing the specular reflection based on a longest distance among the first distance to the first measurement point and the second distance to the second measurement point and the first and second projection angles when the first and second incidence angles are judged to be equal to each other.

2. The distance measurement system according to claim 1, further comprising:
   an extraction unit which, when it is judged by the judgment unit that the specular reflection is caused, extracts a reflection member having a predetermined shape near a reflection point at which the specular reflection is caused; and
   an inclination angle calculation unit which calculates an inclination angle of the reflection member extracted by the extraction unit,
   wherein the operation unit calculates a distance to a point at which a specularly reflected light is produced based on the first and second projection angles, the first and second distances, the inclination angle, the inter-apparatus distance, and the first and second incidence angles equal to each other.

3. The distance measurement system according to claim 1, wherein the image pick-up apparatus comprises a photoelectric conversion element having a plurality of pixels two-dimensionally arranged, and outputs a pixel signal string of the plurality of pixels in synchronous with the projection of the measurement beams, and
   the distance calculation unit comprises: a specification unit which specifies a pixel outputting a pixel value with high brightness in the pixel signal string of each of the images picked up by projecting the measurement beams at the first and second projection angles; and a determination unit which determines the first and second incidence angles of the first and second reflected lights which are incident on the pixels specified by the specification unit.

4. The distance measurement system according to claim 3, wherein the judgment unit judges that the specular reflection is caused when the same pixel is specified by the specification unit in at least two images picked up when the measurement beams are projected at the first and second projection angles.

5. The distance measurement system according to claim 3, wherein the judgment unit judges that the specular reflection is caused when different distances are calculated for the same pixel specified by the specification unit in at least two images picked up when the measurement beams are projected at the first and second projection angles.

6. The distance measurement system according to claim 1, wherein the operation unit calculates a distance to a point where the specularly reflected light is produced based on the first and second projection angles and the distance calculated for the measurement beam not specularly reflected among the first and second distances by triangulation.

7. The distance measurement system according to claim 2, wherein the detection object is a vehicle, and the reflection member is a bumper of the vehicle.

8. The distance measurement system according to claim 1, wherein the projection apparatus is mounted on a vehicle to project the measurement beams towards an area in front of the vehicle as the detection area, and
   the image pick-up apparatus is mounted on the vehicle to receive the first and second reflected lights from the area in front of the vehicle.

9. A distance measurement method, comprising:
   projecting measurement beams at least at first and second projection angles towards a detection area;
   picking up an image of a first reflected light and an image of a second reflected light from the detection area, and outputting image signals, the first reflected light corresponding to the measurement beam projected at the first projection angle, and the second reflected light corresponding to the measurement beam projected at the second projection angle;
   based on the image signals, calculating a first distance to a first measurement point from a first incidence angle of the first reflected light onto an image pick-up apparatus, the first projection angle and an inter-apparatus distance between a projection apparatus and the image pick-up apparatus, and calculating a second distance to a second measurement point from a second incidence angle of the second reflected light onto the image pick-up apparatus, the second projection angle and the inter-apparatus distance;
   judging that specular reflection is caused when the first incidence angle of the first reflected light is equal to the second incidence angle of the second reflected light; and when it is judged that the specular reflection is caused, calculating a distance to a detection object causing the specular reflection based on a longest distance among the first distance to the first measurement point and the second distance to the second measurement point and the first and second projection angles when the first and second incidence angles are judged to be equal to each other.

10. A distance measurement method, comprising:
projecting measurement beams at least at first and second projection angles;
picking up an image of a first reflected light from a specific measurement point when the measurement beam is projected at the first projection angle, and measuring a distance to the specific measurement point;
judging that specularly reflected light is caused when an image of a second reflected light from the specific measurement point is picked up when the measurement beam is projected at the second projection angle; and
calculating a distance to a point where the specularly reflected light is caused based on the first and second projection angles and the distance to the specific measurement point.

11. A distance measurement system, comprising:
projection means for projecting measurement beams at least at first and second projection angles towards a detection area;
image pick-up means for picking up an image of a first reflected light and an image of a second reflected light from the detection area and outputting image signals, the first reflected light corresponding to the measurement beam projected at the first projection angle, and the second reflected light corresponding to the measurement beam projected at the second projection angle;
distance calculation means for calculating a first distance to a first measurement point from a first incidence angle of the first reflected light onto the image pick-up means, the first projection angle and an inter-apparatus distance between the projection means and the image pick-up means, and for calculating a second distance to a second measurement point from a second incidence angle of the second reflected light onto the image pick-up means, the second projection angle and the inter-apparatus distance, based on the image signals;
judgment means for judging that specular reflection is caused when the first incidence angle of the first reflected light is equal to the second incidence angle of the second reflected light; and
operation means for calculating a distance to a detection object causing the specular reflection based on a longest distance among the first distance to the first measurement point and the second distance to the second measurement point and the first and second projection angles when the first and second incidence angles are judged to be equal to each other, in the case where it is judged by the judgment means that the specular reflection is caused.

* * * * *